United States Patent [19]

Kafitz

[11] Patent Number: 5,154,475
[45] Date of Patent: Oct. 13, 1992

[54] HINGE JOINT FOR THE SEATS OF MOTOR VEHICLES AND THE LIKE

[75] Inventor: Egon Kafitz, Hochspeyer, Fed. Rep. of Germany

[73] Assignee: Keiper Recaro GmbH & Co., Remscheid, Fed. Rep. of Germany

[21] Appl. No.: 626,484

[22] Filed: Dec. 12, 1990

[30] Foreign Application Priority Data

Dec. 14, 1989 [DE] Fed. Rep. of Germany ....... 3941215

[51] Int. Cl.$^5$ .............................................. B60N 2/02
[52] U.S. Cl. .................................... 297/362; 475/175
[58] Field of Search ................ 297/362; 475/175, 162; 74/411.5

[56] References Cited

U.S. PATENT DOCUMENTS

| | | | |
|---|---|---|---|
| 4,227,741 | 10/1980 | Gross et al. | 74/409 X |
| 4,371,207 | 2/1983 | Wilking et al. | 74/440 X |
| 4,563,039 | 1/1986 | Jörg | 297/362 |
| 4,708,392 | 11/1987 | Werner | 297/362 |
| 4,715,656 | 12/1987 | Walk et al. | 475/162 X |
| 4,773,704 | 9/1988 | Engels | 297/362 |
| 4,786,110 | 11/1988 | Mahling et al. | 297/362 |
| 4,828,322 | 5/1989 | Walk | 297/362 |
| 4,832,405 | 5/1989 | Werner | 397/362 |
| 4,836,606 | 6/1989 | Werner | 297/362 |
| 4,836,607 | 6/1989 | Klüting | 297/355 |
| 4,874,204 | 6/1989 | Wald | 297/362 |

FOREIGN PATENT DOCUMENTS 3013304 5/1983 Fed. Rep. of Germany.

Primary Examiner—Kenneth J. Dorner
Assistant Examiner—Milton Nelson, Jr.
Attorney, Agent, or Firm—Peter K. Kontler

[57] ABSTRACT

A hinge joint for use in the seat of a motor vehicle to pivotally connect the back rest to the body supporting portion has first and second leaves which are affixed to the body supporting portion and to the back rest, respectively, and a pintle which can be rotated by a wheel or by a motor and carries an eccentric installed in an opening of one of the leaves. The eccentric is assembled of two spring-biased arcuate mirror symmetrical sections and a sickle-shaped centering section. The other leaf is rotatably mounted on the pintle. When the pintle is rotated, an arm or a lobe of a motion transmitting member which is affixed to the pintle first disengages the two mirror symmetrical sections from the one leaf so that the one leaf is thereupon engaged only by the centering section while the teeth of an internal gear on one of the leaves roll along the teeth of a spur gear on the other of the leaves.

16 Claims, 2 Drawing Sheets

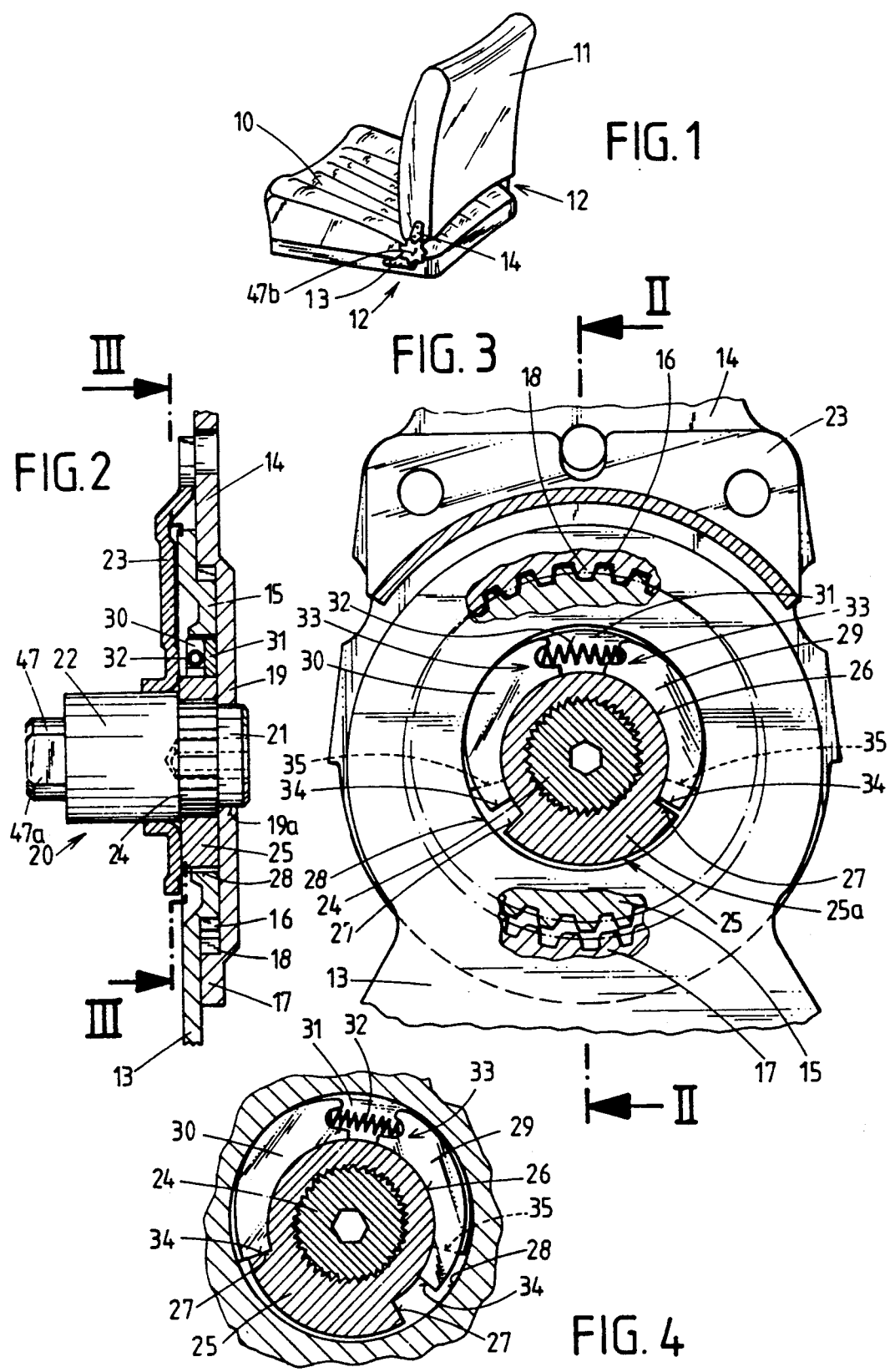

HINGE JOINT FOR THE SEATS OF MOTOR VEHICLES AND THE LIKE

BACKGROUND OF THE INVENTION

The invention relates to hinge joints in general, and more particularly to improvements in hinge joints which can be used to pivotally secure the back rest to the body supporting portion of a seat, e.g., the driver's seat or a passenger seat in a motor vehicle. Still more particularly, the invention relates to improvements in hinge joints of the type wherein a first component is affixed to the body supporting portion of the seat, a second component is affixed to the back rest of the seat, and the second component can turn relative to the first component about the axis of a pintle or shaft which pivotally connects the second component to the first component.

Hinge joints of the above outlined character are normally provided with a set of gears or a like device which serves to pivot the second component relative to the first component between a plurality of different positions and includes means for releasably holding or locking the second component in a selected angular position relative to the first component. As a rule, the pintle carries an eccentric which mounts one of the components, for example, the first component.

Commonly owned German Pat. No. 30 13 304 to Wilking et al. discloses a hinge joint wherein the eccentric comprises a motion transmitting member which is non-rotatably connected with the pintle and two arcuate sections which surround a portion of the pintle and flank the motion transmitting member. Each arcuate section has a first end which is adjacent the motion transmitting member and a second end, and the eccentric further comprises a spring which biases the second ends of the sections away from each other. The arrangement is such that the convex peripheral surfaces of the arcuate sections are biased against a surface surrounding an opening in the one component during each stage of utilization of the patented hinge joint, i.e., when the back rest is held in a selected angular position as well as while the back rest is in the process of changing its angular position relative to the body supporting portion of the seat. The extent of frictional engagement between the peripheral surfaces of the sections and the one component is temporarily reduced during the initial stage of each angular adjustment of the back rest relative to the body supporting portion of the seat. However, the force which is being applied to the back rest in order to change its angular position promotes frictional engagement between the peripheral surfaces of the sections and the internal surface of the one component of the hinge joint. Therefore, it was already proposed to reduce friction between the sections and the one component by reducing the area of the peripheral surfaces of the sections. This, in turn, entails pronounced wear upon the peripheral surfaces and the development of large specific pressure between the sections and the one component of the hinge joint. Therefore, a person wishing to change the angular position of the back rest must exert a substantial force which is particularly undesirable when the angular position of the back rest is to be changed by a person who already occupies the body supporting portion of the seat, by an adolescent, by an elderly person or by a person who is weakened as a result of illness and/or for other reasons. Moreover, the wear upon the parts of the eccentric and upon the one component of the hinge joint is very pronounced.

OBJECTS OF THE INVENTION

An object of the invention is to provide a hinge joint which can stand longer periods of use than heretofore known hinge joints.

Another object of the invention is to provide a novel and improved eccentric for use in the above outlined hinge joint.

A further object of the invention is to provide a hinge joint wherein the components can be mounted on the pintle without any play when the back rest of the seat is maintained in a selected angular position.

An additional object of the invention is to provide a hinge joint wherein the parts of the eccentric are subjected to less wear than in heretofore known hinge joints for the back rests of seats in motor vehicles and the like.

Still another object of the invention is to provide a hinge joint wherein the wear upon the parts of the hinge joint during angular adjustment of the back rest is a fraction of wear upon the parts of the eccentric in a conventional hinge joint.

A further object of the invention is to provide a novel and improved set of arcuate sections for use in the eccentric of the above outlined hinge joint.

Another object of the invention is to provide a seat embodying one or more hinge joints of the above outlined character.

SUMMARY OF THE INVENTION

The invention is embodied in a hinge joint which serves to change the position of a back rest relative to the body supporting portion of a seat, particularly a seat (such as the driver's seat) in a motor vehicle. The improved hinge joint comprises a first component which can be said to constitute a first leaf of the hinge joint and is fixedly connectable to the body supporting portion of the seat, a second component which can be said to constitute a second leaf of the hinge joint and is fixedly connectable to the back rest of the seat, a pintle which pivotally connects the second component to the first component, means for pivoting the second component relative to the first component between a plurality of different angular positions and including means for releasably holding the second component in a selected angular position relative to the first component, and an eccentric which is provided on the pintle and mounts one of the components on the pintle. The eccentric comprises a motion transmitting member which is non-rotatably affixed to the pintle, first and second substantially wedge-like sections which extend circumferentially of the pintle and flank the motion transmitting member, energy storing means (e.g., a compressed helical spring) reacting against one of the first and second sections and bearing against the other of the first and second sections to urge the sections away from each other, and a substantially sickle-shaped third or centering section which partly surrounds and contacts the pintle and is adjacent the first and second sections (as seen in the axial direction of the pintle). The one component has an opening which receives the three sections of the eccentric. The first and second sections of the eccentric are or can be disposed in a common plane which extends radially of the pintle. The energy storing means is disposed between confronting first end portions of the first and second sections, and the motion transmitting member is disposed between confronting second end portions of the first and second sections.

Each section is preferably provided with a convex peripheral surface and a concave internal surface. The radius of curvature of the convex peripheral surface of the centering section at least approximates (or matches) the radius of curvature of the peripheral surface of each of the first and second sections, and the radius of curvature of the concave internal surface of the centering section at least approximates (or matches) the radius of curvature of the internal surface of each of the first and second sections. The internal and peripheral surfaces of the centering section have non-coinciding centers of curvature which are spaced apart from each other by a first distance, and the centers of curvature of the peripheral and internal surfaces of each of the first and second sections are also spaced apart from each other but by a distance which is greater than the first distance.

The first and second sections of the eccentric have confronting end faces at their first ends, and the energy storing means is disposed between such confronting end faces. At least one of the end faces has a recess which extends in the axial direction of the pintle, and the one end face can be provided with an abutment or stop which is disposed radially inwardly of the recess, i.e., such abutment or stop is located between the pintle and the recess as seen in the radial direction of the pintle.

The convex peripheral surface of each of the first and second sections preferably includes a first portion with a larger radius of curvature adjacent the respective end face, and a second portion having a smaller radius of curvature. The second portion of the peripheral surface of each of the first and second sections is preferably longer than (e.g., three times as long as) the first portion.

The motion transmitting member can be provided with two shoulders which extend substantially radially outwardly from and are spaced apart from one another in the circumferential direction of the pintle. The centering section of the eccentric has first end faces which are adjacent the shoulders of the motion transmitting member, and each of the first and second sections has a second end face which is adjacent a different shoulder of the motion transmitting member. The shoulders are or can be spaced apart from each other (in the circumferential direction of the pintle) by an angle of at least 180 degrees. Moreover, the centering section is preferably turnable about the pintle (namely between the two shoulders of the motion transmitting member) through a first angle, and the assembly of the first and second sections plus the energy storing means is turnable about the pintle (i.e., between the two shoulders of the motion transmitting member) through a second angle which is smaller than the first angle.

The eccentric can further comprise a sleeve having a tubular portion which surrounds the first and second sections of the eccentric and the energy storing means, and an end wall or bottom wall which constitutes or forms part of the centering section. The motion transmitting member can include an arm which extends into the tubular portion of the sleeve between the second ends of the first and second sections. The bottom wall or end wall of the sleeve can be provided with a window for a portion of the arm. The motion transmitting member of such hinge joint further comprises means for receiving torque from the pintle. An antifriction bearing can be provided to surround the sleeve and to be installed in the opening of the one component, e.g., in an opening of the first component which is connectable with the body supporting portion of a seat.

The novel features which are considered as characteristic of the invention are set forth in particular in the appended claims. The improved hinge joint itself, however, both as to its construction and the mode of installing and using the same, together with additional features and advantages thereof, will be best understood upon perusal of certain presently preferred specific embodiments with reference to the accompanying drawing.

BRIEF DESCRIPTION OF THE DRAWING

FIG. 1 is a schematic perspective view of a seat for use in a motor vehicle wherein the back rest is pivotably connected to the body supporting portion of the seat by two hinge joints each of which embodies one form of the invention;

FIG. 2 is an enlarged central sectional view of one of the hinge joints for use in the seat of FIG. 1, the section being taken in the direction of arrows as seen from the line II—II in FIG. 3;

FIG. 3 is a partly elevational and partly sectional view of the hinge joint, substantially as seen in the direction of arrows from the line III—III in FIG. 2;

FIG. 4 shows a detail of the structure of FIG. 3 but with the pintle and the motion transmitting member in a different angular position relative to the first, second and centering sections of the eccentric;

DESCRIPTION OF PREFERRED EMBODIMENTS

Figure 6:
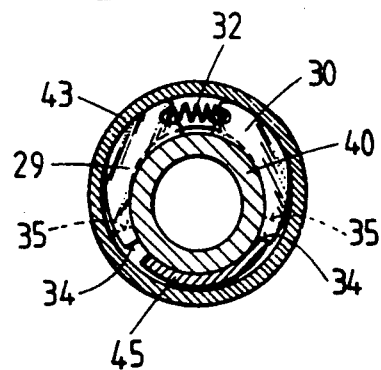
FIG. 6 is a fragmentary sectional view substantially as seen in the direction of arrows from the line VI—VI in FIG. 5.

FIG. 1 shows a seat which can constitute the driver's seat or a passenger seat in a motor vehicle. The seat comprises a body supporting portion 10 and a back rest 11. Still further, the seat comprises two hinge joints 12, one at each side of the body supporting portion 10, which serve to pivotably secure the back rest 11 to the body supporting portion. One of these hinge joints (which are preferably mirror images of each other) is shown in FIGS. 2, 3, 4, 7 and 8.

The hinge joint 12 of FIGS. 2-4 and 7-8 comprises a first component or leaf 13 which is affixed to the body supporting portion 10, a second component or leaf 14 which is affixed to the back rest 11, a horizontal pintle or shaft 20 which establishes a pivot axis for angular movements of the back rest 11 relative to the body supporting portion 10 between a plurality of different angular positions, and an eccentric which is installed in an opening 28 of the component 13 and is mounted on the pintle 20. Still further, the hinge joint 12 of FIGS. 2-4 and 7-8 comprises a mechanism for pivoting the second component 14 relative to the first component 13 between a plurality of different angular positions, and such pivoting means includes means for releasably holding or locking the back rest 11 in a selected angular position. The exact details of the pivoting means form no part of the present invention. Reference may be had, for example, to commonly owned U.S. Pats. Nos. 4,563,039 and 4,715,656. FIGS. 2 to 4 merely show a spur gear 15 which is an integral (e.g., stamped) part of the component 13 and has a set of radially outwardly extending teeth 16 serving to mate with the radially inwardly extending teeth 18 of an internal gear 17 which is an integral (e.g., stamped) part of the component 14. The root circle diameter of the internal gear 17 exceeds the addendum circle diameter of the spur gear 15 by not less than the depth of a tooth 16 (i.e., at least by the distance between the root portion and the top land of a tooth 16). The number of internal teeth 18 equals m+n wherein m is the number of external teeth 16 and n is a whole number including one. The teeth 18 of the internal gear 17 on the component 14 can roll along the external teeth 16 of the spur gear 15 on the component 13.

The making of the internal gear 18 results in the formation of a disc 19 which is an integral part of the component 14 and is surrounded by the gear 17. The disc 19 has an opening 19a which rotatably receives the end portion 21 of the pintle 20. The end portion 21 is coaxial with a second portion 22 of the pintle 20, and the second portion 22 mounts a plate-like member 23 which is rigid with the component 14 and cooperates with the latter to confine the spur gear 15 of the component 13. The second portion 22 of the pintle 20 is adjacent a concentric third portion 47 with one or more peripheral flats 47a which prevent rotation of a handwheel 47b (FIG. 1) serving to turn the pintle 20 about its horizontal axis. The portion 47 is or can be provided with a tapped axial bore (not shown) to receive a threaded fastener (not shown) which holds the wheel 47b in proper position relative to the pintle 20 and components 13, 14 at the respective side of the body supporting portion 10.

A fourth portion 24 of the pintle 20 (between the portions 21 and 22) is surrounded by an entraining or motion transmitting member 25 which has internal axially parallel teeth mating with external axially parallel teeth of the portion 24 to prevent the member 25 from rotating on the pintle. The member 25 has two shoulders 27 which extend substantially radially of the pintle 20 and are spaced apart by an angle of at least 180 degrees. FIG. 3 shows an angle of approximately 270 degrees. The mating teeth of the member 25 and pintle portion 24 can be omitted if the member 25 is non-rotatably shrunk onto the adjacent smooth portion of the pintle 20 or is held against rotation by one or more radially extending screws or other suitable fasteners. The motion transmitting member 25 resembles or constitutes a disc with a lobe 25a between the shoulders 27 and a smooth external surface 26 extending along the aforementioned arc of at least 180 degrees. The center of curvature of the surface 26 is located on the axis of the pintle 20. The lobe 25a can be omitted if the disc-shaped motion transmitting member 25 is provided with two pins, screws, bolts, studs or analogous projections which extend substantially radially outwardly beyond the surface 26 and define the shoulders 27.

The mounting of the disc-shaped portion 19 of the component 14 on the end portion 21 of the pintle 20 is such that the center of the internal gear 17 is located on the axis of the pintle. Centering of the internal gear 17 relative to the pintle 20 is assisted by the plate-like member 23 which is rigid with the component 14 and is rotatable on the portion 22, i.e., on a portion which is concentric with the end portion 21. At least one external tooth 16 of the spur gear 15 mates with the adjacent teeth 18 of the internal gear 17. The opening 28 of the component 13 has a center located on the axis of the spur gear 17. As can be seen in FIG. 3, the opening 28 receives the motion transmitting member 25 with at least some radial clearance. The surface surrounding the opening 28 in the component 13 is eccentric to the external surface 26 of the member 25, i.e., the center of the opening 28 is not located on the axis of the pintle 20. The eccentricity of the surface surrounding the opening 28 relative to the pintle 20 equals or approximates the eccentricity of the annuli of gears 15 and 17 relative to each other. This results in the development of a sickle-shaped clearance between the external surface 26 of the motion transmitting member 25 and the surface which forms part of the component 13 and surrounds the opening 28. Such sickle-shaped clearance receives the parts of an eccentric which includes two wedge-like arcuate sections 29, 30, an energy storing element in the form of a stressed coil spring 32 and a C-shaped or sickle-shaped third or centering section 31. The section 31 is disposed in a plane which extends radially of the pintle 20 and is adjacent the common plane of the sections 29, 30. The sections 29, 30 are mirror images of each other and have first ends with end faces 33 which flank the coil spring 32 and second ends with end faces 34 each of which is adjacent one of the shoulders 27 on the motion transmitting member 25. The spring 32 reacts against the end face 33 of one of the sections 29, 30 and bears against the end face 33 of the other of these sections. This spring is adjacent the location where at least one tooth 16 of the spur gear 15 mates with the adjacent teeth 18 of the internal gear 17, and the purpose of the spring 32 is to bias the adjacent ends of the sections 29 and 30 away from each other, i.e., toward engagement with the surface surrounding the opening 28 in the component 13 on the body supporting portion 10 of the seat. The end faces 34 of the sections 29, 30 are normally adjacent but slightly spaced apart from the respective shoulders 27 of the motion transmitting member 25 (see FIG. 3). The illustrated coil spring 32 can be replaced with another suitable energy storing element, e.g., with a block of rubber or elastomeric plastic material.

The extent of angular movability of the centering section 31 around the external surface 26 and between the shoulders 27 of the motion transmitting member 25 is greater than the extent of angular movability of the assembly including the sections 29, 30 and the spring 32.

Figure 7:
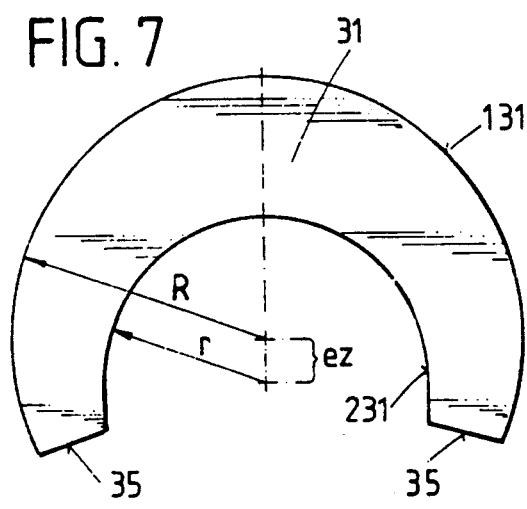
FIG. 7 is an enlarged elevational view of the centering in the eccentric of the hinge joint of FIGS. 2 to 4.
Figure 8:
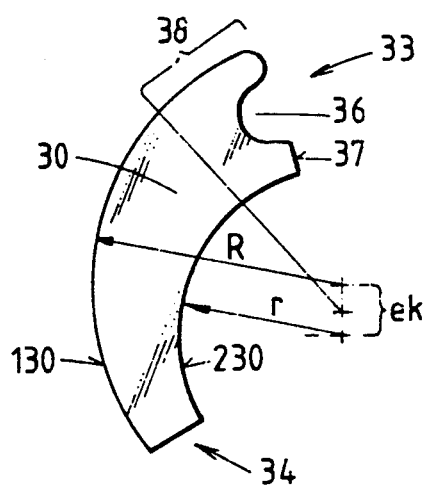
FIG. 8 is an enlarged elevational view of one of the first and second sections in the eccentric of the hinge joint of FIGS. 2 to 4.

FIG. 7 shows the centering section 31, and FIG. 8 shows the section 30 which is a mirror image of the section 29. The radius of curvature R of the convex peripheral surface 131 of the centering section 31 matches or approximates the radius of curvature R of the convex peripheral surface 130 of the section 30, and the radius of curvature r of the concave internal surface 231 of the section 31 equals or approximates the radius of curvature r of the concave internal surface 230 of the section 30. The radis of the surface bounding the opening 28 in the component 13 matches the radii R. The radius of the external surface 26 on the member 25 matches or closely approximates the radii r.

The distance $e_z$ between the centers of curvature of the surfaces 131, 231 on the centering section 31 is less than the distance $e_k$ between the centers of curvature of the surfaces 130, 230 on the section 30 or the distance between the centers of curvature of the convex peripheral surface and the concave internal surface of the section 29.

The end faces 33 of the sections 29, 30 are provided with recesses 36 (FIG. 8) for the adjacent end convolutions of the spring 32, and each of the end faces 33 is provided with an abutment or stop 37 which is radially inwardly adjacent the respective recess 36. The stops 37 can limit the extent of movability of the end faces 33 toward each other. The recesses 36 are or can be provided substantially midway between the peripheral and internal surfaces of the respective sections 29, 30.

The peripheral surface 130 of the section 30 includes a flatter first portion 38 (FIG. 8) which is adjacent the respective end face 33, and a second portion having a more pronounced curvature and extending from the first portion 38 to the second end face 34 of the section 30. The configuration of the peripheral surface of the section 29 is identical with that of the peripheral surface 130. The length of the first portion 38 can equal or approximate one-fourth of the length of the entire peripheral surface 130. The purpose of the relatively flat portion 38 (with a larger radius of curvature) is to stabilize the position of the component 14 and pintle 12 during stagnation of the hinge joint 12 while the back rest 11 is maintained in a selected angular position with reference to the body supporting portion 10 of the seat which embodies the hinge joint of FIGS. 2 to 4 and 7-8. The provision of first portions 38 ensures a substantially linear engagement when the back rest 11 is held in a selected position and such linear engagement takes place at both sides of the locus of mesh of one or more teeth 16 with one or more teeth 18.

If the wheel 47b is caused to turn the pintle 20 in a clockwise direction, advancing from FIG. 3, the mating teeth of the portion 24 and of the member 25 ensure that the pintle 20 shares the angular movement of the member 25. The left-hand shoulder 27 of the member 25 moves toward and engages the end face 34 of the left-hand section 30 of FIG. 3. Further rotation of the pintle 20 in the clockwise direction results in disengagement of the section 30 from the surface surrounding the opening 28. The section 30 is disengaged when the left-hand shoulder 27 reaches and engages the adjacent end face 35 of the centering section 31. The other (29) of the two identical sections 29, 30 remains in the position of FIG. 3 during the aforedescribed initial stage of turning of the pintle 20 in a clockwise direction. The end face 33 of the section 30 approaches the end face 33 of the section 29 because the spring 32 is caused to store additional energy as the pintle 20 continues to turn while the left-hand shoulder 27 engages and pushes the end face 34 of the section 30 in a clockwise direction. This can be seen in FIG. 4. When the sections 29, 30 are disengaged from the surface surrounding the opening 28, the gears 15 and 17 have freedom of radial movement relative to each other. The radial movement is terminated when the surface surrounding the opening 28 reaches the centering section 31 in the region of mesh between the teeth of the gears 15 and 17. If the wheel 47b continues to turn the pintle 20 in the clockwise direction, the locus of mesh between the teeth of the gears 15, 17 is moved at the speed of angular movement of the pintle 20 so that a turning of the pintle 20 through 360 degrees results in pivoting of the component 14 relative to the component 13 through an angle which corresponds to the width of one of the teeth 16 or 18.

The back rest 11 is caused to pivot in the opposite direction if the wheel 47b is turned to rotate the pintle 20 in a counterclockwise direction (as seen in FIG. 3). The right-hand shoulder 27 of the motion transmitting member 25 then engages the end face 34 of the section 29 and thereafter the right-hand end face 35 of the section 31.

An important advantage of the improved hinge joint is that, when the sections 29, 30 are disengaged from the component 13 during the initial stage of (preparatory to) angular adjustment of the back rest 11, the elimination of radial play between the gears 15, 17 is interrupted and the section 31 thereupon serves to center the component 13 during further rotation of the pintle 20 in a clockwise or counterclockwise direction. Thus, the sections 29, 30 are not under stress during actual adjustment of the back rest 11 because the component 13 is then centered exclusively by the section 31. Thus, the surface bounding the opening 28 contacts only the convex peripheral surface 131 and the surface 26 is engaged primarily or exclusively by the concave internal surface 231 of the section 31.

An advantage of the feature that the radius of curvature R of the peripheral surface 131 matches or closely approximates the radii of curvature R of the peripheral surfaces of the sections 29, 30 and that the radius of curvature r of the internal surface 231 matches or closely approximates the radii of curvature r of the internal surfaces of the sections 29, 30 (but that the distance ek is greater than the distance ez) is that the radial play between the teeth 16 and 18 is eliminated when the back rest 11 is maintained in a selected angular position.

The relatively flat portions 38 of peripheral surfaces of the sections 29, 30 exhibit the advantage that only the section 31 performs a centering function during angular adjustment of the back rest 11 relative to the body supporting portion 10 of the seat.

The purpose of the feature that the angular movability of the section 31 between the shoulders 27 of the motion transmitting member 25 is greater than the angular movability of the assembly including the sections 29, 30 and the spring 32 is that this ensures reliable disengagement of the sections 29, 30 from the surface surrounding the opening 28 during the initial stage of adjustment of the back rest 11.

Figure 5:
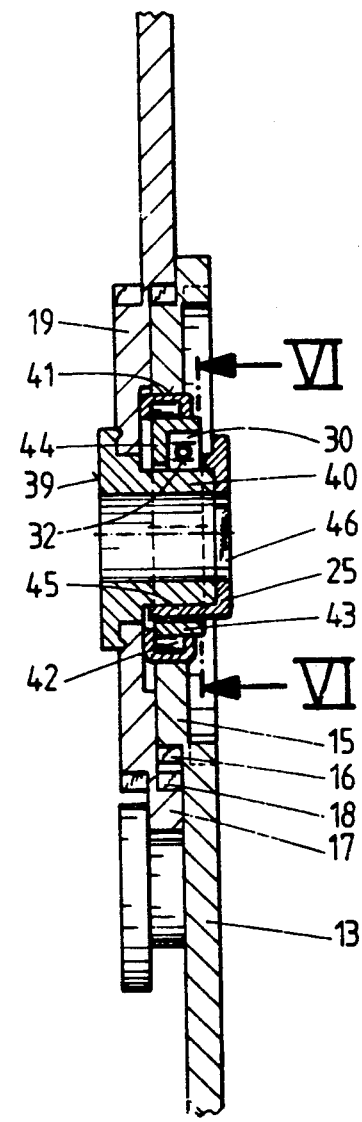
FIG. 5 is a sectional view of a modified hinge joint wherein the third section of the eccentric forms an integral part of a sleeve.

FIGS. 5 and 6 show a modified hinge joint. The manner in which the gears 15 and 17 cooperate to change the angular position of the back rest relative to the body supporting portion of the seat is the same as described with reference to FIGS. 1 to 4 and 7-8. The disc 19 of the component 14 which, as shown in FIG. 5, carries a muff 39 having a tubular portion 40 which extends, with radial clearance, into the opening 41 of the spur gear 15. The opening 41 receives an antifriction ball or roller bearing 42 which surrounds the tubular portion 43 of a sleeve; this sleeve further includes a bottom wall or end wall 44 which is a functional equivalent of the centering section in the hinge joint 12 of FIGS. 2 to 4. The concave internal surface of the centering section or end wall 44 closely surrounds the peripheral surface of tubular portion 40 of the muff 39. The latter is surrounded by the two mirror symmetrical sections 29, 30 of the eccentric on the pintle (not shown in FIGS. 5 and 6). The convex peripheral surfaces of the sections 29, 30 abut the internal surface of the tubular portion 43 of the sleeve which further includes the centering section or end wall 44. A coil spring 32 is provided to bias the adjacent (first) ends of the sections 29 and 30 away from each other.

The motion transmitting member 25 of the hinge joint which is shown in FIGS. 5 and 6 comprises an arm 45 which extends through a window of the section 44 and performs the function of lobe 25a of the motion transmitting member in the hinge joint 12 of FIGS. 2 to 4. The major part of the motion transmitting member 25 of FIG. 5 is adjacent the tubular portion 40 of the muff 39 and has a non-circular bore or hole 46 to receive a portion of the pintle in such a way that the pintle cannot turn relative to the motion transmitting member 25 and vice versa.

The mode of operation of the hinge joint which embodies the structure of FIGS. 5 and 6 is analogous to that of the hinge joint 12 of FIGS. 2 to 4.

An advantage of the hinge joint of FIGS. 5 and 6 is the compactness of its eccentric including the sections 29, 30 and 44. Thus, the section 44 constitutes the bottom wall or end wall of a sleeve further having a tubular portion 43 which confines the sections 29, 30 and the spring 32. The arm 45 extends through the window of the end wall or centering section 44 to perform the function of the lobe 25a and to be non-rotatably connected with the pintle. The purpose of the bearing 42 is to reduce friction and to thus ensure that the angular position of the back rest can be changed with a minimum of effort.

Hinge joints which are similar to the hinge joint of the present invention are disclosed in numerous United States and foreign patents and patent applications of the assignee of the present application. Reference may be had, for example, to U.S. Pats. Nos. 4,708,392, 4,773,704, 4,786,110, 4,828,322, 4,832,405, 4,836,606, 4,836,607 and 4,874,204.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A hinge joint for changing the position of a back rest relative to a body supporting portion of a seat, particularly in a motor vehicle, comprising a first component connectable with the body supporting portion; a second component connectable with the back rest; a pintle having an axis and pivotally connecting said second component to said first component; means for pivoting said second component relative to said first component between a plurality of different positions, including means for releasably holding said second component in a selected position relative to said first component; and an eccentric provided on said pintle and mounting one of said components, said eccentric including a motion transmitting member non-rotatably affixed to said pintle, first and second substantially wedge-like sections extending circumferentially of said pintle and flanking said motion transmitting member, energy storing means reacting against one of said sections and bearing against the other of said sections to urge said sections away from each other, and a substantially sickle-shaped centering section partly surrounding and contacting said pintle and being adjacent said first and second sections in the axial direction of said pintle, said one component having an opening and said sections being disposed in said opening.

2. The hinge joint of claim 1, wherein said first and second sections are disposed in a common plane extending substantially radially of said pintle and each of said first and second sections has a first and a second end portion, said energy storing means being disposed between said first end portions and said motion transmitting member being disposed between said second end portions.

3. The hinge joint of claim 1, wherein said first and second sections have confronting end faces and said energy storing means is disposed between said end faces, at least one of said end faces having a recess extending in the axial direction of said pintle and said one end face being provided with a stop which is disposed radially inwardly of said recess.

4. The hinge joint of claim 1, wherein each of said sections has a convex peripheral surface and a concave internal surface and each of said surfaces has a radius of curvature, the radius of curvature of the peripheral surface of said centering section at least approximating the radii of curvature of the peripheral surfaces of said first and second sections and the radius of curvature of the internal surface of said centering section at least approximating the radii of curvature of the internal surfaces of said first and second sections.

5. The hinge joint of claim 4, wherein the peripheral and internal surfaces of said centering section have spaced apart first and second centers of curvature disposed at a first distance from each other, the peripheral and internal surfaces of each of said first and second sections having third and fourth centers of curvature spaced apart from each other a second distance greater than said first distance.

6. The hinge joint of claim 1, wherein each of said first and second sections has a convex peripheral surface and an end face adjacent the peripheral surface, each of said peripheral surfaces including a first portion adjacent the respective end face and a second portion, said first portions having first radii of curvature and said second portions having second radii of curvature smaller than said first radii.

7. The hinge joint of claim 6, wherein the length of each of said first portions is a fraction, particularly approximately one-fourth, of the length of the respective peripheral surface in the circumferential direction of said pintle.

8. The hinge joint of claim 1, wherein said motion transmitting member has two shoulders extending substantially radially outwardly from said pintle and being spaced apart from one another in the circumferential direction of said pintle, said centering section having first end faces adjacent said shoulders and each of said first and second sections having a second end face each adjacent a different one of said shoulders.

9. The hinge joint of claim 8, wherein said shoulders are spaced apart from each other at an angle of at least 180 degrees.

10. The hinge joint of claim 8, wherein said centering section is turnable about said pintle between said shoulders through a first angle and said first and second sections are turnable with said energy storing means about said pintle through a second angle smaller than said first angle.

11. The hinge joint of claim 1, wherein said eccentric further comprises a sleeve having a tubular portion surrounding said first and second sections and said energy storing means, said sleeve further having an end wall constituting said centering section.

12. The hinge joint of claim 11, wherein said motion transmitting member further comprises means for receiving torque from said pintle.

13. The hinge joint of claim 11, wherein said motion transmitting member includes an arm extending into said tubular portion between said first and second sections.

14. The hinge joint of claim 13, wherein said end wall has a window for a portion of said arm.

15. The hinge joint of claim 11, further comprising an antifriction bearing surrounding said sleeve and installed in one of said components.

16. The hinge joint of claim 15, wherein said bearing is installed in said first component.

* * * * *